(12) United States Patent
Chien

(10) Patent No.: US 11,271,408 B2
(45) Date of Patent: Mar. 8, 2022

(54) DESK TOP ITEM WITH LED MEANS HAS USB-UNITS OR USB-MODULE TO CHARGE OTHER ELECTRIC OR DIGITAL DATA DEVICES

(71) Applicant: Tseng-Lu Chien, Walnut, CA (US)

(72) Inventor: Tseng-Lu Chien, Walnut, CA (US)

(*) Notice: Subject to any disclaimer, the term of this patent is extended or adjusted under 35 U.S.C. 154(b) by 0 days.

(21) Appl. No.: 14/643,026

(22) Filed: Mar. 10, 2015

(65) Prior Publication Data
US 2015/0176826 A1  Jun. 25, 2015

Related U.S. Application Data

(63) Continuation of application No. 14/144,703, filed on Dec. 31, 2013, which is a continuation of application
(Continued)

(51) Int. Cl.
| | | |
|---|---|---|
| *H02J 7/00* | (2006.01) | |
| *F21S 8/00* | (2006.01) | |
| *H01R 13/66* | (2006.01) | |
| *H01R 25/00* | (2006.01) | |
| *H02G 3/14* | (2006.01) | |

(Continued)

(52) U.S. Cl.
CPC .............. *H02J 7/00* (2013.01); *F21S 6/003* (2013.01); *F21S 8/035* (2013.01); *F21V 15/01* (2013.01); *F21V 23/02* (2013.01); *F21V 23/023* (2013.01); *F21V 23/06* (2013.01); *F21V 33/00* (2013.01); *F21V 33/0004* (2013.01); *F21V 33/0024* (2013.01); *F21V 33/0048* (2013.01); *F21V 33/0056* (2013.01); *G02B 6/0045* (2013.01); *G04B 19/30* (2013.01); *G06F 1/266* (2013.01); *G09F 23/00* (2013.01); *H01R 13/6691* (2013.01); *H01R 25/006* (2013.01); *H02G 3/14* (2013.01); *H02J 4/00* (2013.01); *H02J 7/007* (2013.01); *H02J 7/0042* (2013.01); *H02J 7/0047* (2013.01); *F21V 23/0442* (2013.01); *F21V 33/006* (2013.01); *F21W 2121/00* (2013.01); *F21Y 2115/10* (2016.08); *G02B 6/0021* (2013.01); *H01H 2009/186* (2013.01); *H01R 13/713* (2013.01); *H01R 24/76* (2013.01);
(Continued)

(58) Field of Classification Search
CPC .. F21S 6/002; F21S 6/003; F21S 6/005; F21S 8/035; H01R 13/6691; G02B 6/0045
USPC ............................ 362/95, 157, 641; 439/490
See application file for complete search history.

(56) References Cited

U.S. PATENT DOCUMENTS

| | | | |
|---|---|---|---|
| 6,474,823 B1 | 11/2002 | Agata et al. | |
| 7,679,317 B2 * | 3/2010 | Veselic | G06F 1/266 |
| | | | 320/106 |

(Continued)

OTHER PUBLICATIONS

Quirky Ember Portable Lamp with USB Ports and Power Outlets, by Daniel , Jan. 28, 2011, (http://gadgetsin.com/quirky-ember-portable-study-lamp-with-usb-ports-and-power-outlets.htm).*

*Primary Examiner* — Anabel Ton
(74) *Attorney, Agent, or Firm* — Bacon & Thomas, PLLC

(57) ABSTRACT

Desk top items with LEDs or another light source also include at least one USB-unit or USB-module and, optionally, additional outlet-units, to supply power to other electric or digital devices such as a smart phone or digital data device. The USB-unit(s), USB-module(s) or outlet-unit(s) fit within or are installed anywhere on the desk top item's housing, including anywhere on a base, pole, bar, stand, step, contour, edge, or wall of the housing.

5 Claims, 10 Drawing Sheets

Related U.S. Application Data

No. 13/161,643, filed on Jun. 16, 2011, now Pat. No. 8,783,936.

(51) Int. Cl.

| | |
|---|---|
| *H02J 4/00* | (2006.01) |
| *G06F 1/26* | (2006.01) |
| *F21V 23/06* | (2006.01) |
| *F21V 23/04* | (2006.01) |
| *H01H 9/18* | (2006.01) |
| *H01R 13/713* | (2006.01) |
| *H01R 24/76* | (2011.01) |
| *F21V 8/00* | (2006.01) |
| *G09F 23/00* | (2006.01) |
| *F21V 23/02* | (2006.01) |
| *F21V 33/00* | (2006.01) |
| *F21V 15/01* | (2006.01) |
| *G04B 19/30* | (2006.01) |
| *F21S 6/00* | (2006.01) |
| *F21W 121/00* | (2006.01) |
| *H01R 103/00* | (2006.01) |
| *F21Y 115/10* | (2016.01) |

(52) U.S. Cl.
CPC ....... *H01R 2103/00* (2013.01); *H02J 2207/20* (2020.01)

(56) References Cited

U.S. PATENT DOCUMENTS

| | | | |
|---|---|---|---|
| 7,736,033 B2 * | 6/2010 | Patel | 362/414 |
| 7,742,293 B2 | 6/2010 | Strauser | |
| 7,897,277 B2 | 3/2011 | Meyer et al. | |
| 8,116,007 B2 | 2/2012 | Tsai | |
| 8,432,667 B2 | 4/2013 | Strauser | |
| 8,545,039 B2 | 10/2013 | Patel | |
| 8,562,187 B2 | 10/2013 | Smed | |
| 8,593,912 B1 * | 11/2013 | Amores | G04G 11/00 368/79 |
| 8,687,392 B2 * | 4/2014 | Sims | H02M 7/02 363/125 |
| 8,758,031 B2 | 6/2014 | Cheng et al. | |
| 8,783,936 B2 * | 7/2014 | Chien | 362/641 |
| 8,853,884 B2 * | 10/2014 | genannt Berghegger | H02J 9/005 307/125 |
| 8,899,797 B2 | 12/2014 | Schaak | |
| 8,911,137 B2 * | 12/2014 | Chien | 362/641 |
| 8,915,608 B2 * | 12/2014 | Chien | 362/157 |
| 9,057,490 B2 * | 6/2015 | Sharrah | F21L 4/04 |
| 2005/0169812 A1 * | 8/2005 | Helf | A01M 1/04 422/123 |
| 2006/0209530 A1 * | 9/2006 | Schaak | G11B 33/06 362/86 |
| 2006/0221017 A1 * | 10/2006 | Fang | G09F 9/30 345/83 |
| 2009/0067161 A1 | 3/2009 | Nagata | |
| 2010/0224697 A1 * | 9/2010 | Modlin | B05B 17/0684 239/102.1 |
| 2010/0321939 A1 * | 12/2010 | Patel | F21S 6/002 362/253 |
| 2015/0070896 A1 * | 3/2015 | Chien | 362/253 |
| 2016/0050375 A1 * | 2/2016 | Soffer | H04N 5/268 348/445 |

\* cited by examiner

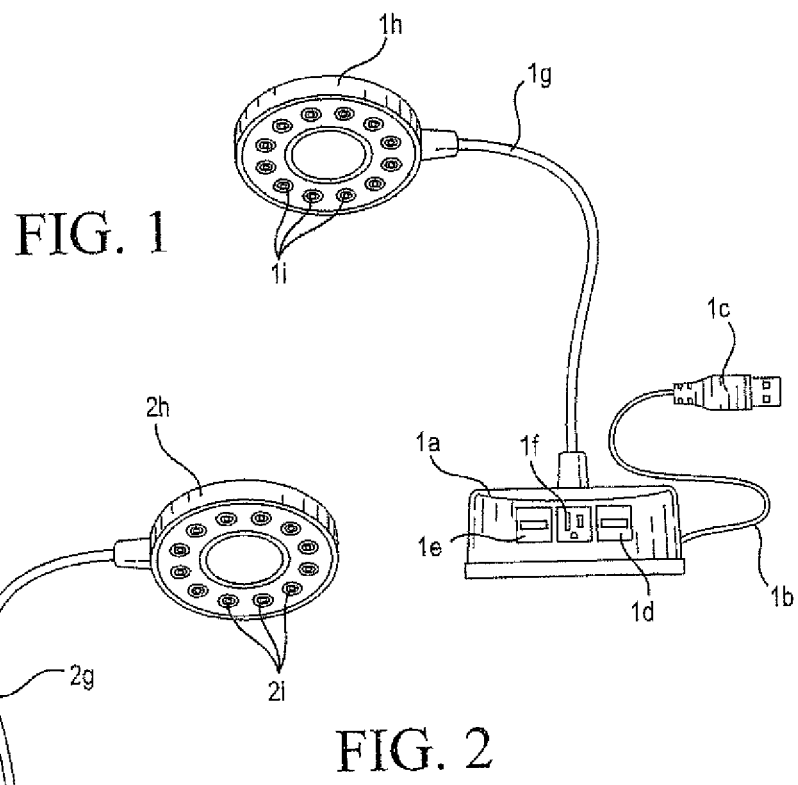
FIG. 1
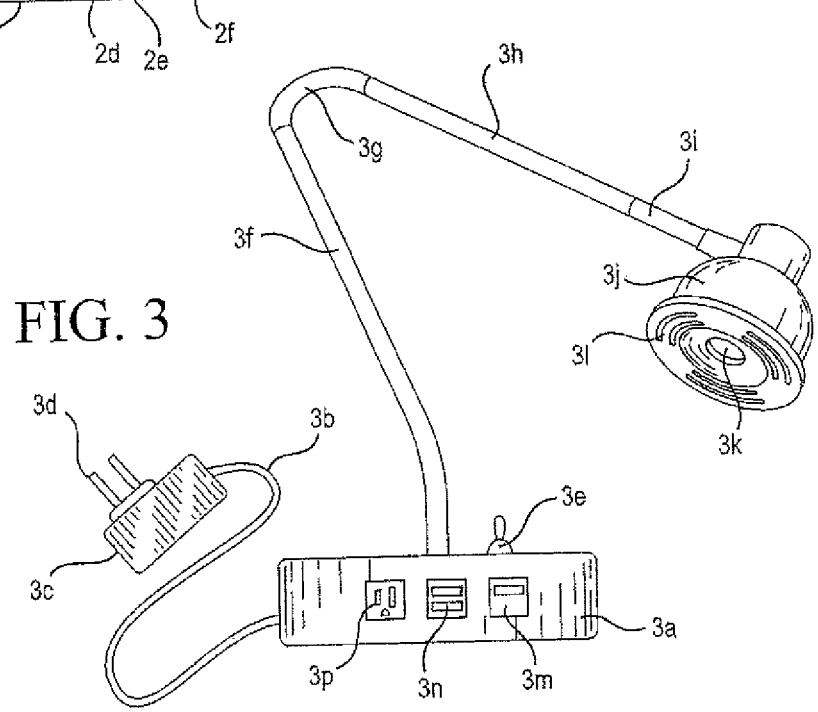
FIG. 2
FIG. 3

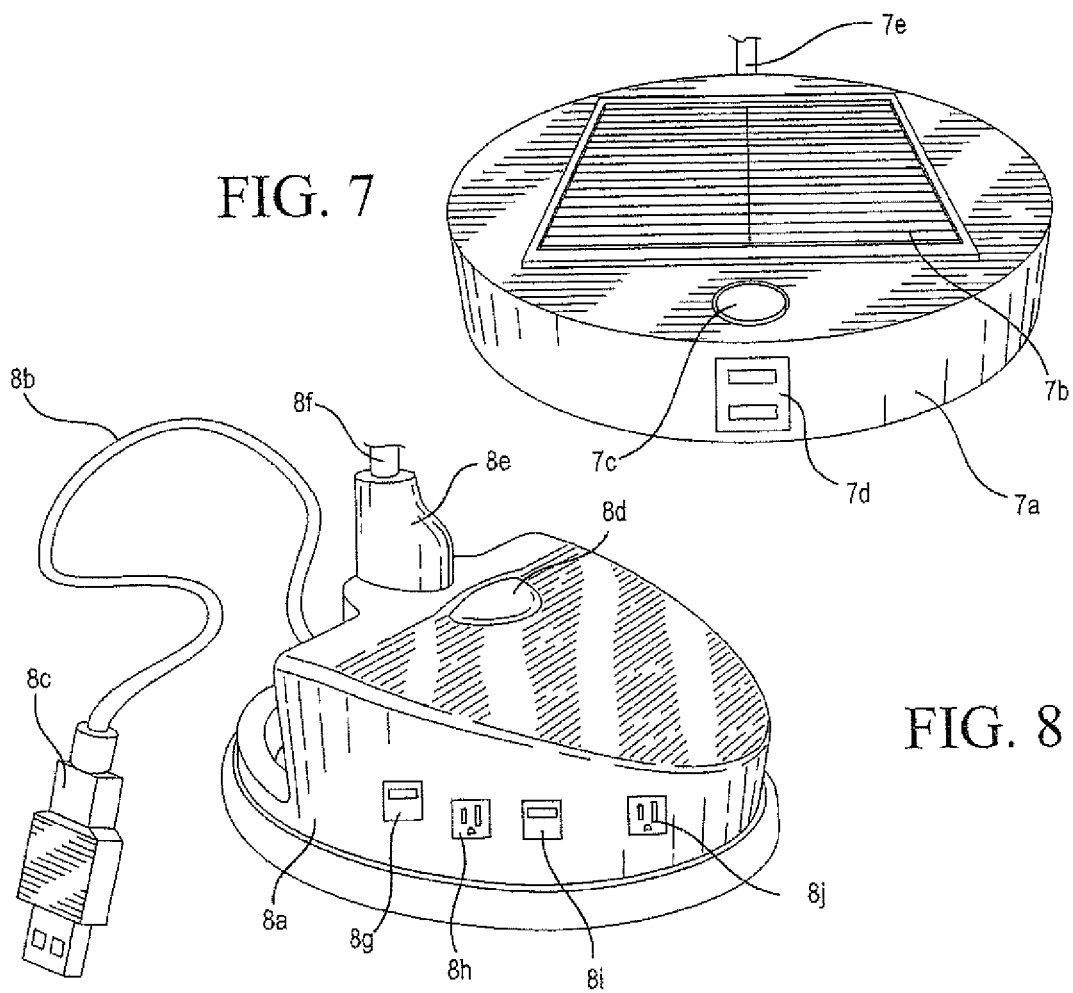
FIG. 7
FIG. 8
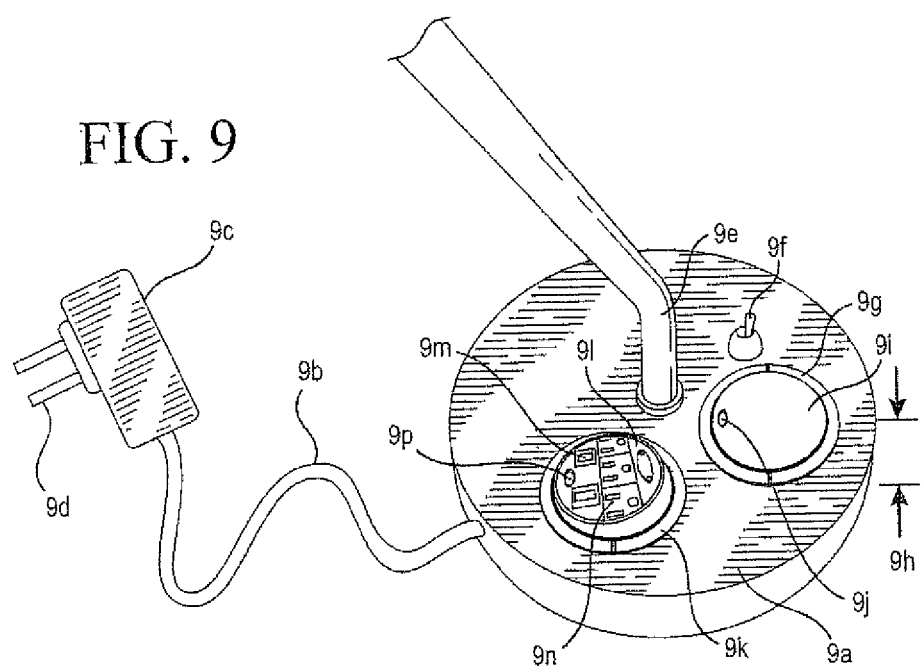
FIG. 9

FIG. 20
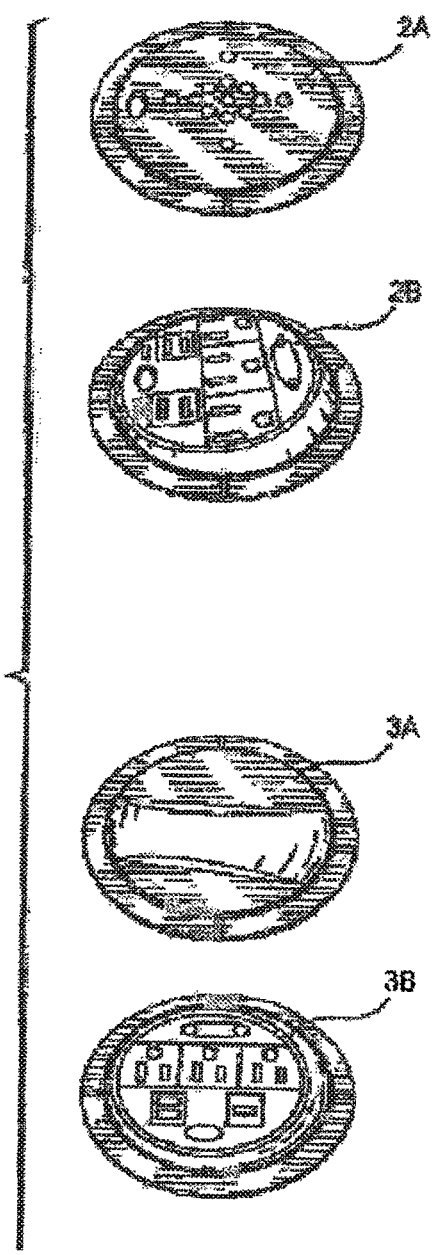
FIG. 25
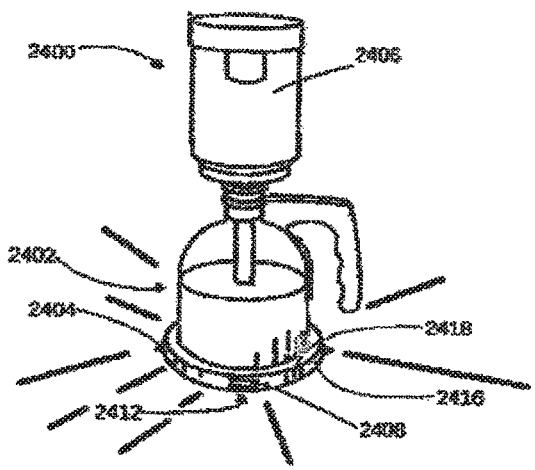
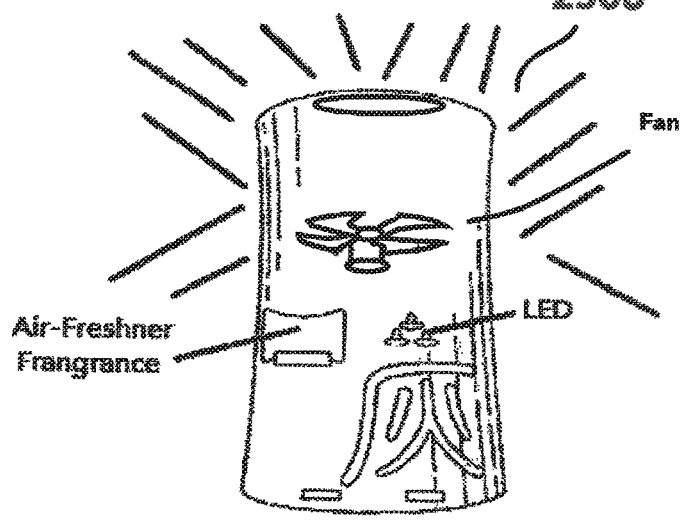
FIG. 26

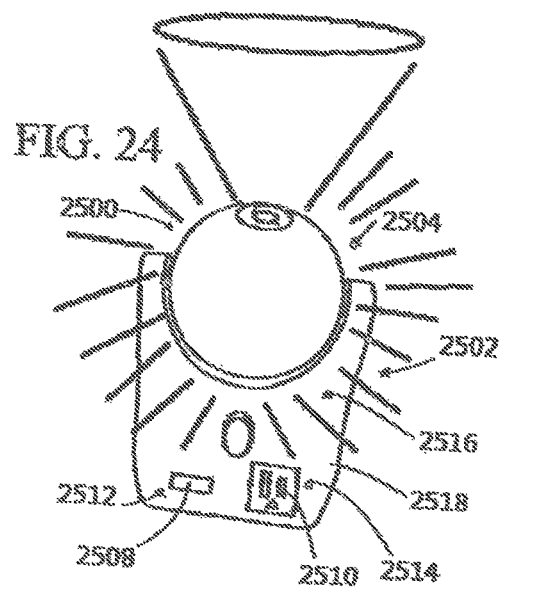
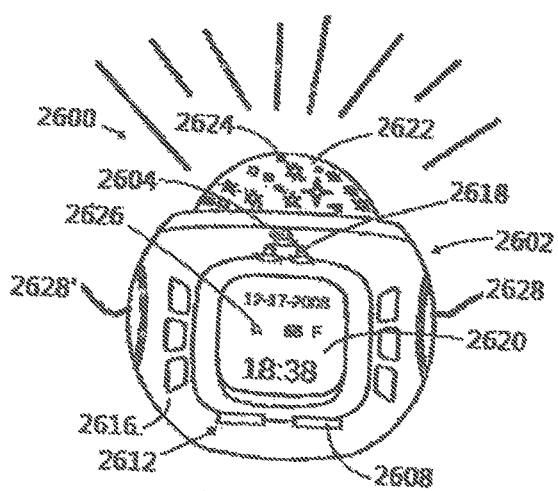
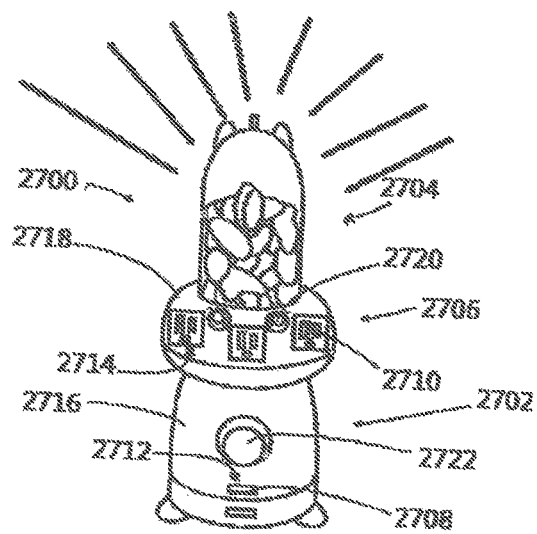
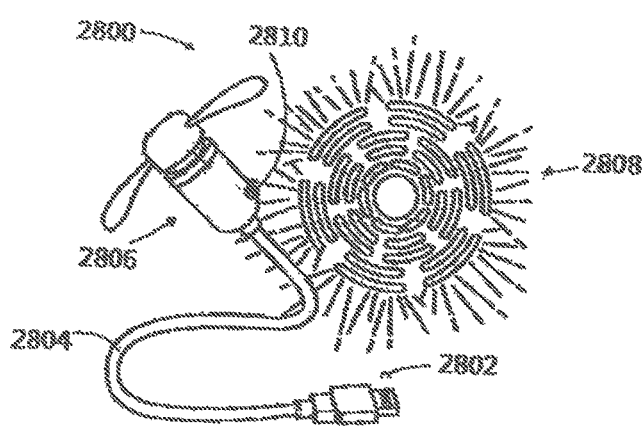

DESK TOP ITEM WITH LED MEANS HAS USB-UNITS OR USB-MODULE TO CHARGE OTHER ELECTRIC OR DIGITAL DATA DEVICES

This application is a continuation of U.S. patent application Ser. No. 14/144,703, filed Dec. 31, 2013, which is a continuation of U.S. patent application Ser. No. 13/161,643, filed Jun. 16, 2011, now U.S. Pat. No. 8,783,936, each of which is incorporated by reference herein.

BACKGROUND OF THE INVENTION

This application has subject matter in common with the inventor's U.S. patent application Ser. No. 13/117,227, filed May 27, 2011, entitled "Universal module of USB-unit or Outlet-units for electric or digital data device(s)."

This application also has subject matter in common with the inventor's U.S. patent application Ser. Nos. 12/502,661, 12/292,580, 12/566,322, 11/498,874, 11/527,629, 12/622,000, and 12/624,621, which disclose a sealed-unit with uniform dimensions and shape to fit into the same uniformly dimensioned compartment so that the universal sealed-unit can fit into a variety of LED light devices. The sealed unit(s) disclosed in these applications share the following features:

- The sealed-unit(s) has uniform dimensions to fit into the uniform compartment of any kind of LED light device.
- The sealed-unit(s) has passed all related safety standards and received a laboratory's safety certification so that it can be used with other LED light device's parts and accessories which may or may not meet the safety standard passed by the sealed-unit(s).
- The sealed-unit(s) can be any individually salable unit because it has passed all related safety requirements and standards. The other parts or accessories may or may not be just decorative or have other functions to make the LED light device more valuable.

The current invention utilizes the sealed-unit concept in the following manner:

(1) The current invention utilizes the concept disclosed in the above-cited applications of providing a sealed-unit that has passed all the relevant safety standards, but applies the concept to other electric device(s) which are not limited to an LED light device. The concept may be applied to an LED light device, power strip device, wall outlet device, surge protection device, wall adaptor device, charging device(s), smart phone related device(s), computer related device(s), and other consumer electric device(s).

(2) The sealed-unit may be in the form of a USB-unit or outlet-unit rather than the previously disclosed LED-unit, battery-pack, or prong-means.

(3) The USB-unit or outlet-unit both may be arranged to supply power from these units to a variety of electric devices to keep the electric device(s) in good power condition for people to use.

(4) The USB-unit or outlet-unit may each include its own related circuit-means, conductive-means, contact-means, receiving-means, output-ends, input-ends, electric parts and accessories to supply electric power from a prong-cable means or USB-cable means to a receiving-means for supplying power to a variety of electric device(s).

(5) The current invention offers a universal design for the USB-unit or outlet-unit with the most compact size to enable each of the USB-unit and outlet-unit or any combination of USB-units and/or outlet-units to form a desired module that fits into all kinds of electric device(s), including an LED light device, wall outlet, wall outlet adaptor, power strips, surge protector, communication device, computer device, consumer electric device, smart phone device, panel computer device, etc.

(6) Once the USB-unit or outlet-unit has passed all related safety standards and has its own issued certification, the finished electric device in which it is used does not need to get an additional safety certification related to USB-units or outlet-units.

(7) The modules of the current invention can utilize any combination of suitable USB-unit or outlet-unit parts, such as a conductive wire, conductive plate, conductive means, contact-means, prong-cable means, USB-cable means, prong-means, resilient conductive means, printed circuit means, flexible circuit means, related electric parts and accessories, fixing means, positioning means, and/or installation means to enable the module, outlet-unit, or USB-unit to pass the safety standard and get the relevant safety certification and be added onto another electric device.

(8) The module of the current invention may have different specifications, such as:

1 USB-unit with 1 USB-port,
1 USB-unit with 2 USB-ports+1 outlet-unit,
1 USB-unit with 2 USB-ports+2 outlet-units,
1 outlet-unit,
or
any combination of USB-units and outlet-units that still permits a standard module to fit into different electric device(s) as needed.

(9) The module can also have the following different specifications:

2 USB ports having different current outputs including 500 ma, 1 Amp, 1.1 Amp, and/or 2.2 Amps to enable the 2 USB-ports to charge different electric devices such as an iPhone™, which needs to have 1 Amp, and an iPad™, which requires 2.1 Amps. If people want to charge 1 iPhone™+1 iPad™ at the same time, at least 3.1 Amps will be needed, which will be very expensive. If people want to charge the 1 iPhone™ or 1 iPad™ at different times, the standard module can be 1 port 1 Amp+1 port 1.1 Amp=2.1 Amps total, and the cost will be cheaper. If people want to charge only 1 iPhone™, only 1 USB-unit with 1 port which has only 1 Amp is needed for the most economical product. Hence, the module of the invention should not be limited to only one specification.

(10) Because the standard module, outlet-unit or USB-unit is a sealed-unit that has its own issued safety certification and that can fit into the uniform compartment of any other electric device, there is no need to file, for each different electric devices, a UL, ETL, or CSA safety certification, which saves a lot of time for tooling, development, and safety testing for each different electric device. This will reduce a lot of R&D, development, tooling, and safety certification time and fees.

The co-pending application entitled "Universal module of USB-unit or Outlet-unit for electric or digital data device," U.S. Ser. No. 13/117,227, discloses a simple arrangement for enabling "Desk Top items with LED means having USB-unit(s) or USB-module(s) to charge a variety of electric or digital data device(s)," which does not require a universal module because some of the desk top items have plenty of room/space to accommodate a larger size of USB-unit(s) or USB-module(s) and reduce the cost for related electric components, parts, or accessories to make the items more cost attractive to the consumer. The USB-unit(s) is an electric charging unit which has a USB-female receiving means (hereafter as USB-port) to receive a USB-male prong (hereafter as USB-plug) to deliver electric power from the USB-female receiving means (USB-port) to the other device's USB-male prong (USB-plug). The preferred USB-female receiving means (USB-ports) gets power from a power source and uses circuit means to convert the input electric power to output power having a desired waveform, voltage, and current flow or amperage (A or ma) to enable the other device's USB-male means (USB-plug) to supply power to other electric or digital device(s).

The USB-module described in the copending application is an electric charging module which has at least one USB-female receiving means (USB-port) but also has a number of receiving means selected from an outlet-female receiving means (outlet-ports), USB-female receiving means (USB-ports), an adaptor's female receiving means (adaptor-ports), or any conventional female receiving means (any-other-ports) to form a single body which has more than one USB-female receiving means (USB-port) to offer the same or different electric power though the different female receiving means (different ports) within the one body. The USB-module connects with an input power source and circuit-means to offer a desired waveform, voltage, and current (A or ma) as output power to charge other device(s) when the female receiving means (USB ports) is connected with other device's male prong means (USB-Plug) of each style of the connect-means.

To enable people to easily reach, touch, operate, or manage the desk top items, the USB-unit(s) or USB-module(s) are installed on or within the item/housing or a substrate(s). The items may be positioned at a location where people will stay for a period of time, such as a desk, table, bed, chair, land, grass, or wherever else people work, rest, or take a nap. For example, people use a computer, laptop computer, iPhone™, iPad™, or iCloud™ on a substrate(s), location, or place such as a table, desk, bed, laptop stand, laptop supporter, laptop cushion or any similar surface(s) which allows people to work, sleep, or lay down for a period of time while charging other electric or digital data device(s).

In all such places where people will stay for period of time, the nearby desk top items have built-in USB-units to easily offer electric power to all other electric or digital data device(s), so people do not need to bend their body to find a power source under the table, which normally is farther away than the desk top items having LED means. Hence, this arrangement offers good convenience for people while they work, rest, or even take a nap, so that they can easily use the USB-unit(s) or USB-module of the desk top items to charge their small phone, computer, iPad™, or any other electric or digital data device(s) while they work, rest, sleep or take a nap.

It is desirable for the universal module of the USB-unit(s) or outlet-unit(s) described in the co-pending application to be made as small as possible so that it can fit into as many applications' limited housing size as possible and therefore really meet the goal of universal applicability. On the other hand, the smallest, slimmest, or most compact size of the USB-unit(s), outlet-unit(s), or USB-module is too expensive. For example, the APPLE™ iPhone™'s or iPad™'s USB-unit, which is very small in size, needs to use a very high cost compact transformer or inverter with super big power output in order to achieve a very short time to fully charge the other electric or digital data device(s). This problem can be resolved if, in order to get the USB-3.0 standard 2.1 amp output from the USB-unit(s), the size of some electric components, parts, or accessories such as transformer or inverter, or other same-function electric parts, or accessories can be increased by placing it in a desk top item with sufficient space, thereby obtaining the same big power output at a substantially lower cost to let the consumer save pocket money. Suitable desk top items to which a universal module, USB-unit, or outlet-unit can be added include a desk lamp, desk top clock, desk top radio, desk top fan, desk top lighting, reading light, wall reading light, head lighting, book light, electric picture display, night light with AC to DC power source or adaptor with prong and wire means, projection light with AC to DC power source or adaptors with prong and wire means, electric candle set with AC to DC power source or adaptors with prong and wire means, or any LED device that can serve as a desk top item as described herein and that can accommodate a USB-unit or USB-ports designed only for charging purposes rather than delivery of digital data. The desk top items can provide function(s), performance, and effects(s) including, by way of example, generation of light beams and projection of images such as time images, as well as serving as a source of illumination, music, power, electric signals, photos, and digital signals for sound, light, music, smell or any conventional market-available devices that people will keep on for a period of time sufficient to also enable charging of other electric or digital data device(s).

The USB-units, outlet-units, and/or USB-modules of the preferred embodiments may utilize any of a variety of USB or outlet specifications, such as USB-1.0, USB-2.0, USB-3.0, 1,850 Watt, or 1,650 Watt outlet specifications. Accordingly, the parts and devices included in the illustrated embodiments should not be limited to the illustrated embodiments, but rather may be varied or modified in a number of ways, and may include any of the following:

1. A USB-unit charger in the form of an individual charger that is exclusively for charging, and that has an inner circuit for changing an input current into an output current capable of charging another device from its USB port(s). The USB-unit can include its own housing or be installed within a desk-top housing, so long as all live-wires or electricity-carrying parts and accessories, other than the USB-ports, are not touchable by people.

The charger takes one and only one input power or current, which is converted by the inner circuit into a DC current having a desired voltage and amperage. The charger cannot have more than one different input current, such as an AC or DC input current, or it will be totally destroy the output current because the inner circuit is fixed for one and only one current specification.

2. An outlet-unit charger in the form of an individual power supply device having an outlet-receptacle which can receive another device's prongs to deliver or supply AC current from the outlet-unit's power source though the outlet-unit's port(s) to the other device's prongs and into the other device's circuit to power the other device. This unit can have its own housing or be installed within the desk-top housing, so long as all live-wires or electricity-carrying parts and accessories except the outlet-unit(s) are not touchable by people.

3. A USB-module charger, which is not a single USB-Unit Charger but can include any combination of the USB-unit(s) and/or outlet-unit(s) with any number of USB-port(s) and/or outlet-port(s) to connect with another electric or digital data device's male prong(s) or plug(s) for charging or supplying DC and/or AC current to other devices(s). This unit can have its own housing or be installed within a desk-top housing with all live-wires or electricity-carrying parts and accessories except the USB-port(s) and/or outlet-port(s) being untouchable by people.

4. A sealed-unit having any desired combination of any number of USB-unit(s) and/or outlet-unit(s) arranged, combined, or sealed into a one-piece housing that has passed all USA required safety standards and obtained a test labs' certification for the sealed unit only, not including other housing parts or accessories that are unrelated to the USB or outlet charger and that may be added onto the sealed unit, with all live-wires or electricity-carrying parts and accessories being sealed within the sealed unit.
5. A universal charger having a finished housing and electric-contacts such as prongs, wires, or quick-connector(s) that are not only incorporated with the desk-top item but can also be used for other applications. One preferred embodiment includes a market-available USB-2.1 Amp charger having three USB-ports with prongs. This can installed within a current invention desk-item's housing by wires or outlets and can also be taken apart from the desk-top item's housing and carried with people to be plugged-into a wall outlet for charging a computer, communication device, consumer electric item, or any other electric or digital data device while the device is plugged-into an outlet on a wall or a power strip's outlets.
6. A USB female receiving means including a USB-port capable of receiving a USB male prong means to enable electric current delivery.
7. An outlet female receiving means including an outlet port capable of receiving another electric or digital data device's prong means so as to deliver AC current from the outlet-port(s) to the other electric or digital data device.
8. Desktop items, which may include products having an LED or other light source, such as an LED or other light source that serves as an indicator light to show charging or charging status, or an LED light source for supplying LED light beams for reading. The other light source may be a bulb, an incandescent bulb, a CFL, an energy saving bulb, a fluorescent tube, a PL light, or any other light source available from the marketplace.
9. A base of the light device, including any adjacent pole, bar, stand, step, curved surface, edge, and/or contour other than the light source itself or a shade. A USB-port, USB-unit, USB-module, outlet-port, outlet-unit, outlet-module, sealed-unit, universal-unit, or rotatable module can fit within or be installed anywhere on the base of the light device, which may include any kind of light source such as a bulb, incandescent bulb, fluorescent light, LED bulb, LED tube, or an EL, OEL, or organic EL element.

BRIEF DESCRIPTION OF THE DRAWINGS

FIG. 1 is a front view of desk top items with LED means having USB-unit(s) to charge other electric or digital data device(s), according to a first preferred embodiment of the invention, which has 2 USB-units and 1 outlet-unit, 12 LEDs, and is powered by a USB plug-wire means.

FIG. 2 is a side view of the desk top items of the first preferred embodiment.

FIG. 3 shows a first design of a second preferred embodiment of the invention having the outside transformer, or adaptor, or invertor power source which get power from the wall outlet by prongs and the said desk top item having 3 2 USB-unit(s) with different power output (2 USB units has 3 USB-ports and 1 outlet-unit has 1 outlet-port) to charge different electric or digital data device(s), for example 500 ma, 1,000 ma, 2,100 ma (D.C. current output from 2 USB-units has 3 USB-ports) and A.C. current output from the 1 outlet-unit to charge different electric or digital data device(s) such as an iPhone™ and iPad™ for DC current and other device such as laptop computer for AC current to get the different requirements for charging current. Here of the Desk lamp has the light source available from market place for any desire type including bulb, CFL, fluorescent tube, or Energy saving light source.

FIG. 7 also shows the fourth preferred embodiment, in which a relatively large base of the desk top item has sufficient space to install all kinds of USB-unit(s), outlet-unit(s), USB-module(s), outlet-module(s), sealed-units having any number of USB-outlet(s) and/or outlet-unit(s), and/or a universal unit with an number of universal compartments for accommodating any number of USB-outlet(s) and/or outlet-unit(s) to fit within. In addition to AC power from an AC outlet, the base of the desk top item can be powered by wind power, chemical power, battery power, a generator, a transformer, an adaptor, an inverter, an inductor, and so forth.

FIG. 8 shows the first preferred embodiment with different lighting applications (in which the light source is not shown), and which has a thicker or higher base to provide a bigger space to arrange bigger size electric parts and accessories to save the cost of having to provide super compact, slim, or cute electric parts and accessories, and which also can load rotating USB-unit(s) or a rotating USB-Module so that a first surface of the USB-module will look nice when the USB-unit(s) or USB-Module is not in use. Details of the rotating USB module are shown in FIGS. 18, 19, 20, 21, and 22

FIGS. 9, 10, 11, and 12 show fifth and sixth preferred embodiments in which desk top items with LED means also have a thicker or higher base, and which can add rotating USB-modules with a plurality of USB-unit(s) and/or outlet-unit(s) and/or a plurality of other receiving means (other-ports) to increase the number of function(s), feature(s), effect(s), and/or performance(s), the USB-module having more than one surface and the capability of changing the surface for different purposes.

The embodiment of FIG. 9 is a desk lamp that can include any kind of light source and which has two rotatable modules, each rotatable module having a built-in desired number of USB-units, outlet-units, USB-modules, outlet-modules, sealed-units, and/or universal-units to get desired functions. The desk lamp of FIG. 9 also has switch means to turn-on or turn-off the said Light source for desk lamp. The base has LED indicator light on the rotatable module's surface to shown the charging status.

Figure 10:
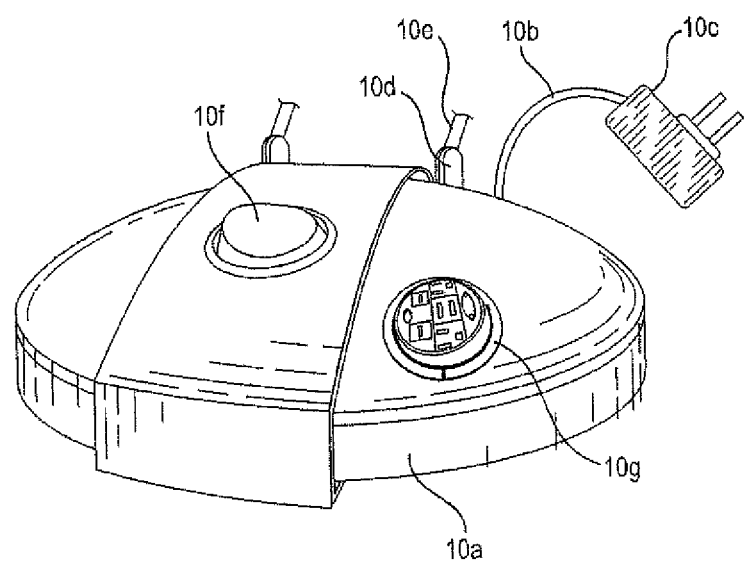

FIG. 10 shows a thicker curved base for a desk lamp having a desired light source for illumination. The desk lamp has a wired plug to connect with a wall-outlet and has an AC current input to an inner circuit to convert the wall-outlet's 120V 60 Hz current into a USB-required DC current and also supply the wall-outlet's 120V 60 hz current to outlet-unit(s). The bulb, incandescent light, fluorescent light or CFL light source is turned-on or turned-off by a switch, sensor, or remote control means on the base surface.

Figure 11:
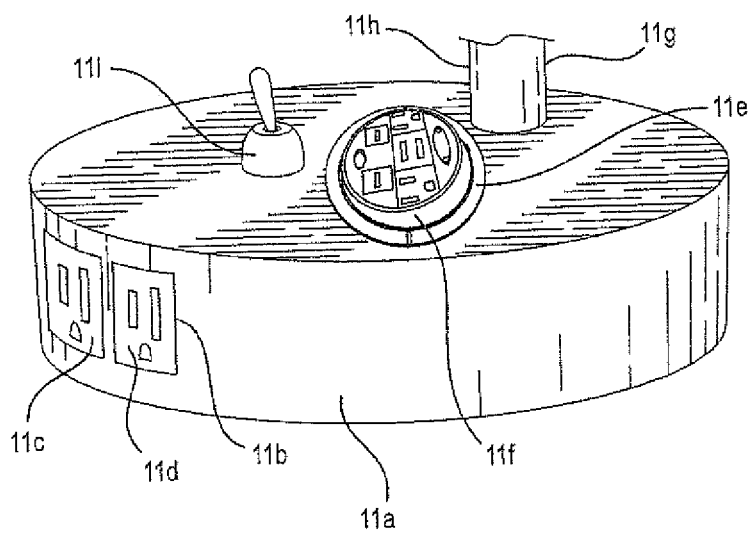

FIG. 11 shows a base of the desk top lighting, which may have any type of light source and which has a rotatable module having a desired number of USB-Unit(s) and/or outlet-unit(s), and optional LED means for charging status indicator lighting. The base not only has a rotatable module but also has an additional outlet-unit or outlet-module(s) to allow charging or supply of AC power to another electric or digital device which needs AC current input to operate.

Figure 12:
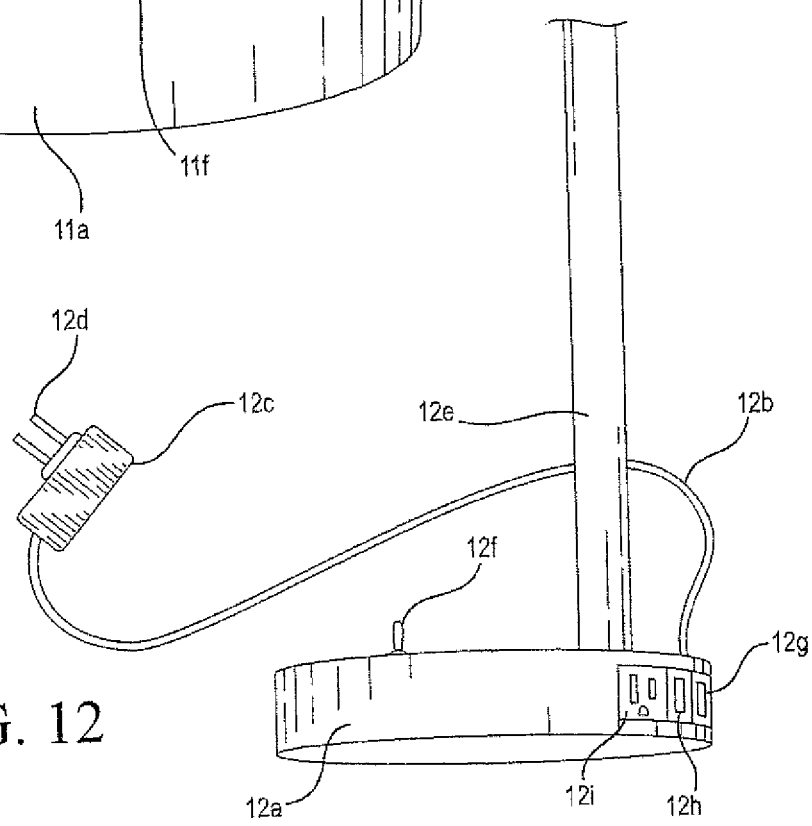

From the FIG. 12 also shows a preferred embodiment in which the light source for a desk top item may be selected from a bulb, CFL, or incandescent light source and which has a big base. The rear-side of the base has any number of outlet-unit so it can be connected with other electric or digital data devices to supply electricity to or charge the other devices. A transformer, adaptor, or inverter not only supplies DC current to the USB-unit(s) but also supplies AC current to the AC Outlet-unit(s).

Figure 13:
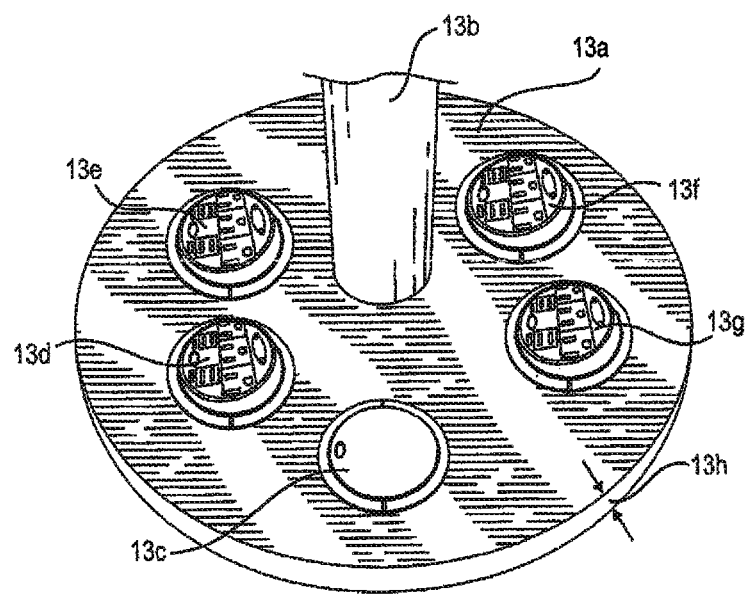

FIG. 13 shows a desk top item which has a super big base so that a plurality of rotating USB-modules can be installed to enable a group of people to charge their electric or digital device(s) at the same time, such as for use in a train station, bus station, airport, meeting room, hotel lobby . . . etc.

Figure 14:
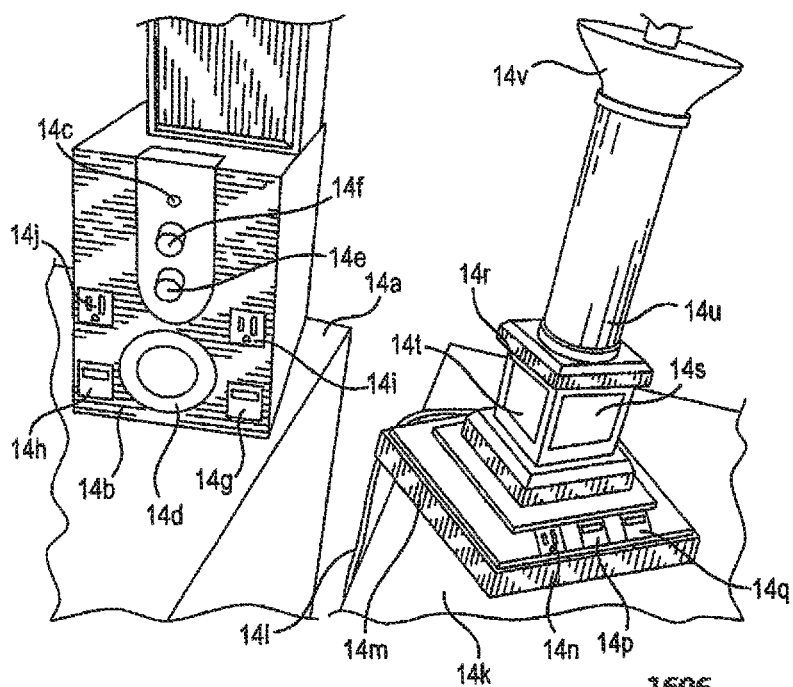

FIG. 14 shows desk top items with LED means having a USB-unit(s), USB-module, or outlet-unit(s) to allow people to charge other electric or digital device(s), the items including for example a radio, time piece, weather station display, fruit blender, food machine, liquid machine, LED lighting, light fixture, projector, electric fan, heater or any conventional items with LED means built-in to offer area illumination, or to display digital time, an image, or charging status. The devices for carrying out the other functions, or the USB-unit(s) or outlet-unit(s), can be installed on the anywhere on the base, a pole, stepped areas, or flat areas of the desk top item and are not limited to only one base surface.

Figure 15:
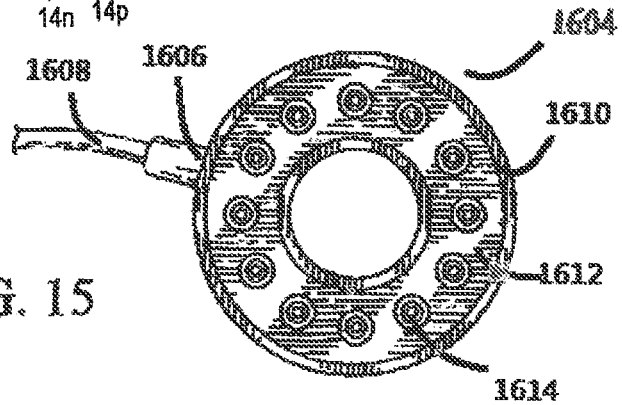
Figure 16:
Figure 17:
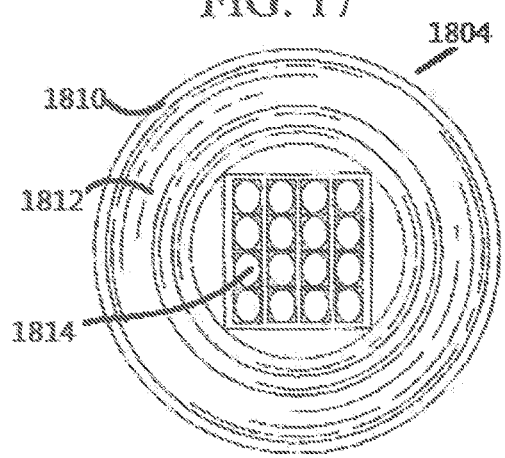
Figure 18:
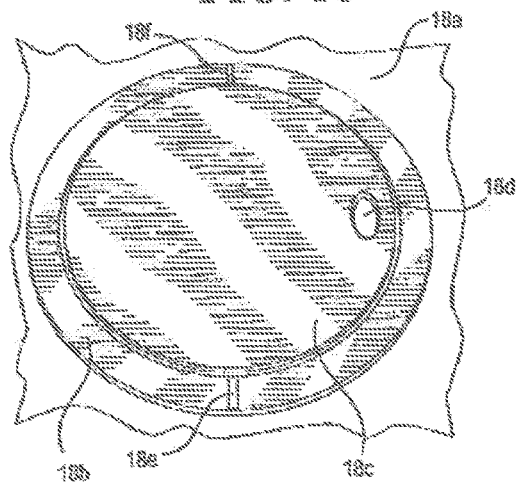

FIGS. 15, 16, and 17 show different LEDs arrangements which are used for LED lighting in order to offer area illumination in the above-discussed preferred embodiments or other desk top items.

FIGS. 18, 19, 20, 21, and 22 show details of a USB-module with at least one USB-unit and a plurality of additional receiving means (additional-ports) such as USB-unit(s), outlet-unit(s), Internet-unit(s), adaptor-unit(s), other light means, or other light sources with appropriate parts and accessories.

FIGS. 23, 24, 25, 26, 27, 28, and 29 show all kinds of desk top items which offer function(s), effects(s), and/or performance(s) to people's eye, nose, mouth, and/or ears for a period of time while people are working, resting, sleeping, or standing.

Pages A, B, C, and D show preferred implementations of the embodiments illustrated in FIGS. 1-29, as follows: Page (A) (1) shows a USB-unit in the form of an individual charger that is exclusively for charging, and that has an inner circuit for changing an input current to an output current capable of charging another device from its USB port(s). The USB-unit can include its own housing or be installed within a desk top housing.

Page A (2) shows a USB-module, which is not a single USB-unit charger but can include any combination or number of USB-unit(s) and/or outlet-unit(s), each having any number of USB-port(s) and/or outlet-port(s) to connect with another electric or digital data device's male prong(s) or plug(s) to charging or supplying DC and/or AC current to other devices(s). This unit can have its own housing or be installed within the desk-top housing.

Page B (3) shows an outlet-unit and outlet module in the form of an individual power supply device having an outlet-receptacle which can receive the other device's prongs to deliver or supply AC current from the outlet-unit's power source through the outlet-unit's port(s) to the other device's prongs and into the other device's circuit to power the other device. This unit can have its own housing or be installed within the desk-top housing.

Page C (4) shows a sealed-unit having any desired combination of any number of USB-unit(s) and/or outlet-unit(s) arranged, combined, or sealed into one piece of the housing and that has passed all USA required safety standards and obtained a test labs' certification for the sealed unit only, which does not include other housing parts or accessories that are unrelated to the USB or outlet charger.

Page C (5) shows a universal charger having a finished housing and electric-contacts such as prongs, wires, or a quick-connector(s) that not only can be incorporated with the desk-top items, but that also can be used for other applications. One of preferred embodiment includes a market-available USB-2.1 Amp charger having three USB-ports with prongs. This can be installed within a desk-item's housing by wires or outlets and can also be removed from the desk-top item's housing and carried by people to plug-into a wall outlet for charging a computer, communication device, consumer electric items, or any other electric or digital data device while the device is plugged-into an outlet on a wall or power strip.

DETAILED DESCRIPTION OF THE PREFERRED EMBODIMENTS

The present invention provides improvements over the sealed-units disclosed in U.S. patent application Ser. Nos. 12/502,661, 12/292,580, 12/566,322, 11/498,874, 11/527,629, 12/622,000, and 12/624,621, which have uniform dimensions and shapes to fit into the same uniformly dimensioned compartment and thereby enable the universal sealed-unit to fit into a variety of LED light devices. This invention has more features, functions, and effects to allow people to buy any electric device or digital data device with the additional convenience of including outlet-unit(s) to supply electric power to other device(s), or USB-unit(s) to supply different types of electric power to other device(s). The current invention uses a universal module which can have any combination of the following parts or accessories, including: circuit-means, conductive-means, contact-means, receiving-means, output-ends, input-ends, electric parts and accessories, prong means, rotating means, cable means with a plug, cable means with a USB-plug, printed circuit means, flexible printed circuit means, wires, a cable, a digital data cable, a conductive plate, or any related electric parts or accessories available from the marketplace to get electric power from a prong-cable means, USB-cable means, prong means, or USB means to the outlet-unit's or USB-unit's receiving-means (hereafter as outlet-ports or USB-ports) and supply power to a variety of electric devices.

The universal module has a same power-supplying function as the "sealed-unit" for the "LED light devices" described in the inventor's issued U.S. Pat. Nos. 8,342,732, 8,305,846, 8,231,246, 8,002,456, 7,726,839, 7,726,841, 7,726,869, 7,618,150, and 7,722,230 and U.S. patent application Ser. Nos. 12/566,322, 12/073,889, 12/894,865, 12/003,809 or the "outlet device" of the inventor's U.S. Pat. No. 7,824,185. Furthermore, the interchangeable "sealed-unit or battery-pack" of the inventor's U.S. patent application Ser. Nos. 12/622,000 and 12/295,562 also utilize concepts shared by the present invention.

FIG. 1 is a front view of a desk top item (1a) LED has non-movable or non-detachable for permanently installed (1h)(1i) and USB-unit(s) (1d)(1e) for charging other electric or digital data device(s) according to a first preferred embodiment of the invention, which has 2 USB-units (1d)(1e) and 1 outlet-unit (1f) at the front or edge wall of the main-base or main-housing. The first preferred embodiment is a 12 LED arranged in a circle with proper space to illuminated for people reading or working desk lamp for USB light powered by a USB plug-wire (1b)(1c) and includes an adjustment arm (1g) having joint-piece (3g)(4g)(5i)

The said desk top lamp has arm(s) and front of arm illumination-unit (LEDs) normally arm on vertical-axis is higher is close to people shoulder while people sit on the chair in front of desk. The arm(s) may in one piece such as FIGS. 1, 2, 6 or more than one piece such as FIGS. 3,4,5 both also can have horizon-axis which at least close half of people chest width because LED(s) is not a radiation-light source which belong to point-light source with narrow light emitting-out angle so need has plenty of the LEDs or super bright power COB LED to make the desired minimum lighted-area has as even as possible brightness or furthermore has glare-protection function to protect people eyes. From FIGS. 1,2,3,4,5,6 can see the all kind of arm(s) for the LED desk top lamp which has traditional height in vertical-axis and length in horizon-axis so the arm(s) and illumination-unit with housing will be almost 2 feet or more which is not easily to carry on or put into backpack.

Furthermore, from FIG. 15,16, 17 show the current invention preferred LED light source(s) 3 preferred arrangement for donut, circle, array, linear, rows, lines, COB (Chip on board) light source which is the way to apply narrow LED emit-out angle to cover minimum size of A4 or B2 or more bigger paper size for people can read or see the items.

However, The alternative arrangement to make the main-base with tower or cone shape to close the people shoulder height to shorter the arm's length or arm piece which still equivalent as above or traditional market discussed the total height of for arm or tower or cone has vertical-axis height close people shoulder while people sit on chair in-front of desk. It is appreciated while use replaceable or equal function skill to make the horizon-axis width by shorter arm or just use longer illumination-unit housing with adjustable angles or orientation instead of use horizon-bar, tube, rod or longer arms. This longer illumination-unit housing with adjustable angle or orientation still belong to make the horizon-axis has approximately width of half of the chest.

Figure 4:
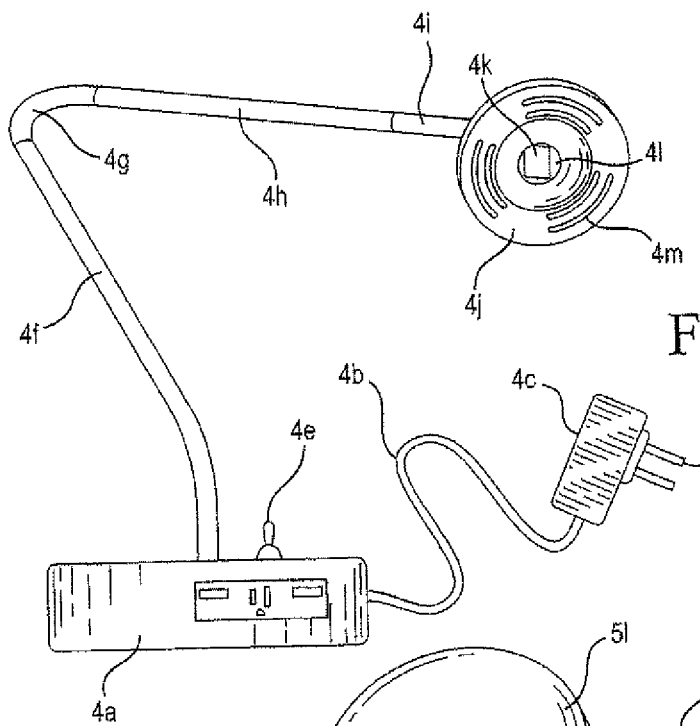
FIG. 4 shows a second design of the second preferred embodiment, which has 2 USB-units has 2 USB-ports and 1 outlet-unit has 1 outlet-port to allow people to charge or supply power to, for example, DC current from USB-ports for an iPad™, iPhone™, and AC current from outlet-port for laptop computer or other device which can get power from the USB-units or outlet-unit. The USB-unit get power from outside transformer, adaptor, inverter to get desired DC current and the outlet-unit get power while prong connect with wall-outlets and directly deliver AC current same as wall outlets current to outlet-unit. Hereof, the Desk lamp is non-LED light source lighting.
Figure 5:
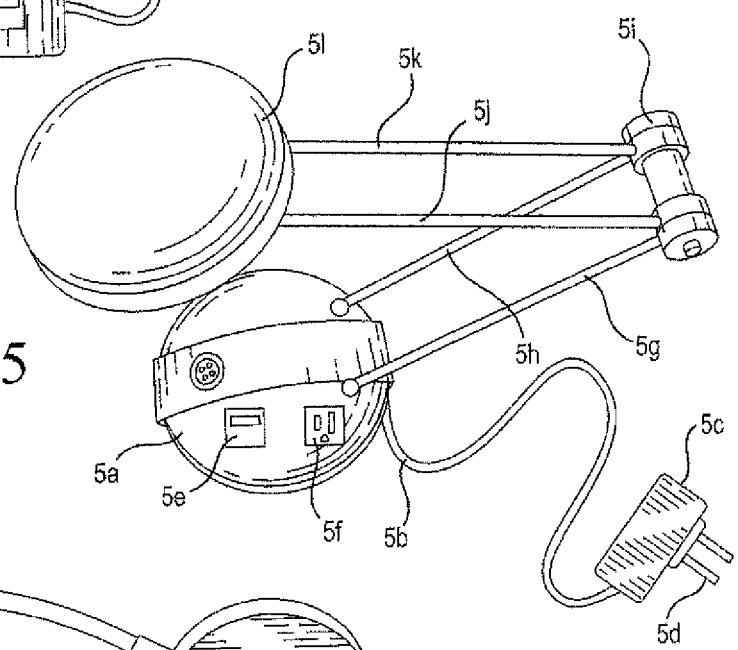
FIG. 5 shows a third preferred embodiment of a desk top item in the form of an LED lighting fixture with adjustable arms to enable adjustment of the height, orientation, direction, and/or angle of the LED lamp to provide the best illumination. The built-in 1 USB-unit has 1 USB-port and 1 outlet-unit has 1 outlet-port has a lower cost than the above-discussed items with a plurality of USB-units and outlet-units, and is powered by a UL listed adaptor OR transformer plugged into a wall outlet that supplies 120 Volt AC current and transfer to DC current for USB-unit has 1 USB-port, rather than by a USB plug and wire.
Figure 6:
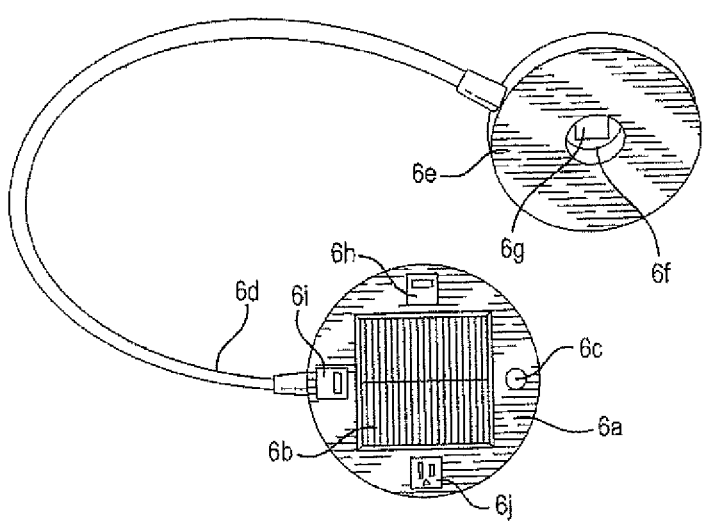
FIG. 6 shows a fourth preferred embodiment which is powered by solar power and stores the solar electricity inside rechargeable batteries to provide enough power to charge other electric or digital data device(s) through built-in USB-unit(s) and outlet-unit(s) incorporated with proper circuit means so as to meet market requirements.

From FIGS. 1,2,3,4,5,6 show all the current invention basic concept and designs and construction which is very simple the basic-parts or accessories is just same as normal market LED desk top lamp with (1) main-base or main-housing which has bigger-size main-base, and (2) arm can be one piece as FIG. 1,2,6 or more than one piece as FIGS. 3,4,5 has multiple tubes, robs, bars with adjustable-kit.

(3) plurality of LEDs fit into the illumination-unit housing which in desired shape and arrangement such as FIGS. 15,16,17 and FIGS. 1,2,3,4,6 show the circle FIGS. 1,2, or-and COB (Chips on Board) as FIGS. 3, 4, or-and donut or circle as FIG. 15, or-and linear or rows or lines as FIG. 16, or-and matrix or array as FIG. 17. These plurality of LEDs arrangement so can let narrow emitting-out angle LEDs.

(4) Alternative to have tower or cone shape taller main-base to replace for the vertical-axis arm-unit or-and use longer illumination-unit similar with FIG. 16 to replace the arm-unit on horizon-axis both still belong to one of alternative or replaceable or same function or equal replacement. So it is appreciated the any LED desk top light has vertical-height and horizon-width construction to make the narrow LED emit-out angle to cover paper size illumination should be still fall into current invention scope, concept, idea for said basic parts of said LED desk lamp or desk top items.

From FIGS. 1, 2, 3, 4, 5, 6 show the basic LED desk lamp has the vertical height and horizon-width construction and concept as common sense for market available desk lamp incorporate with the said permanently or non-detachable USB-unit or USB-Module or outlet-unit or outlet-module is the current invention features to offer people convenience to charge or get AC power source from Desk top and no need to get power from wall outlet anymore.

From FIGS. 1, 2, 3, 4, 5, 6 desk top lamp or items has USB or outlet or other female receiving-ports is same as co-inventor's child filed case which now is U.S. Pat. No. 9,559,472(#110)=(# TTT) U.S. application Ser. No. 13/870, 253 filed on Apr. 25, 2013 and issued date on Jan. 31, 2017 for hand reachable USB charger device which publication number is 2014-032-0063 publication date on Oct. 30, 2014, and U.S. Pat. No. 9,488,364(#106) for USB-Desk Top items has Liquid compartment on top U.S. application Ser. No. 13/870,447 filed date on Apr. 25, 2013 and public-date on Oct. 30, 2014 and issued date on Nov. 8, 2016. Both US patented child case also has the LED light source(s) on top of the main-base which has USB or-and outlets or-and other female receiving ports.

FIG. 2 is a side view of the first preferred embodiment of a desk top item (1a) with LED (2h)(2i) showing 1 USB-unit (2e) and 2 outlet-units (2d)(2f) on the side or on edge wall face outward of the base which has big size. The LED has 12 LEDs (2l) are arranged in circle or donut or other shape as (1) FIG. 15 round space arrangement, or-and (2) FIG. 3 for COB (Chip on board) arrangement or-and (3) FIG. 16 linear or-and line arrangement, or-and (4) FIG. 17 matrix or COB (chip on board) arrangement so can get large area illumination at least A4 or B2 size to let people use for reading or working; for the said LED desktop items such as this embodiments the 12 LEDs in the USB powered light (2h) and is powered from the USB plug-wire (2b)(2c).

FIG. 3 a first design of a second preferred embodiment which has 2 USB-unit(s) (3m)(3N) and an outlet-unit (3p) with different AC or-and DC power output to supply or-and charge different electric or digital data device(s). The USB-unit(s) and (3*m*) (3*n*) may be 500 ma, 1,000 ma, and 2,100 ma units and outlet-unit (3*p*) has outlet's AC current to charge or supply the said DC or-and AC current to different electric or digital data device(s) such as an iPhone™ and iPad™ that have different requirement for charging current. From FIG. 3 also show the Desk top LED light has the electric conductive wire (3*b*) with male AC or AC-to-DC transformer plug or piece (3*c*) with prong (3*d*) to plug-into AC outlet to get AC power source.

From FIG. 3 the adjustable angle arms has multiple-bars (3*f*) (3*h*) and bendable joint (3*g*) to make the bar (3*h*) to adjustable the orientation or-and angle or-and position. The front of bar (3*h*) (3*i*) has LED lamp shade (3*j*) to offer space for inside COB LED (3*k*) and the lamp shade (3*j*) has one cover or lens (3*l*) to adjacent to the lamp shape (3*j*) with openings or slots or cutouts for ventilation purpose while the desk lamp has high-power COB light source (chips on board LED). From FIG. 3 show the base of desk top lamp which has the switch (3*e*) for preferred selection from market place to turn on and turn-off the LED light source for illumination through built-in circuitry or-and circuit(s) to make the said LED light source for desired brightness, color, functions.

FIG. 4 shows a second design of the second preferred embodiment which has 2 USB-units and 1 outlet-unit to allow people to charge or supply power to an iPad™, iPhone™, laptop computer, or other device which can get power from the USB-unit(s) or outlet-Unit. The drawing also shows the differences between the first and second preferred embodiments including the (i) different male-plug such as USB mail-plug (1*c*) (2*c*), AC wire with male plug (4*c*), AC-to-DC transformer with male plug (3*c*), and (ii) different light source arrangement such as FIGS. 1 and 2 for 12 LEDs in circle or donut or round arrangement, or FIGS. 3 and 4 for 1 piece of COB LEDs in round or other shape, or (3) Different control system such as switch or sensor. All such alternative designs, and any improvements or devices with an equivalent function or that are replaceable by the preferred items will still fall within the scope of the current invention, including variations disclosed in the inventor's other patents and patent applications may also fall within the scope of the current invention.

FIG. 5 shows a third preferred embodiment of a desk top item in the form of an LED lighting fixture (5*a*) with adjustable arms (5*g*) (5*h*) (5*i*) (5*k*) (5*j*) which is bars (5*g*) (5*h*) 95*j*) (5*k*) and adjustable-kit (5*i*) to make the LED light source unit (5*l*) to illuminate the desired area min. has A4 or B2 or more large area for illumination and to enable the LED lamp to be moved to a desired height, orientation, direction, and/or angle to get the best illumination to people. The built-in 1 USB-unit (5*e*) and 1 outlet-unit (5*f*) have a lower cost than other above-discussed USB-units and outlet-units because they do not need to be made as compact. The desk top item is powered the transformer of a UL listed adaptor (5*c*)(5*d*) that receives power from a wall outlet for 120 Volt AC current rather than the USB plug and wire of the above preferred embodiment.

From FIG. 5 the LED desktop light because has move the built-in AC-to-DC circuit (not shown) and use the outside LED desk lamp transformer (5*c*) so the big-size base will have plenty of space to install the bigger-size or more-number of the said USB-unit(s)(5*e*) or-and Outlet-unit (5*f*) and other sensor, switch as FIG. 5 show the 4 types switch inside double-circles which can be color, brightness, timer, motion sensor selection to adjust the color, brightness, time delay or motion or no-motion sensor functions. The said outside LED desk lamp transformer (5*c*) may has male-plug (not shown) to insert LED desk lamp female receiving ports (not shown) to build the electric delivery or just direct has wire (5*b*) to connect with inside circuit(s) as predetermined design. From the FIG. 5 the bar or rod or tube (5*g*) (5*h*) (5*j*) (5K) is not bendable and all bar or rod or tube has rotating-joint piece (5*i*). To make the lower tube-assembly (5*g*) (5*h*) to change relative orientation or direction or position with top tube-assembly (5K) (5*j*) so can make the said LED light-unit (5*l*) to desired distance, heights, position and aim to desired location to cover min. A4 or B2 or bigger area for people to reading and working.

FIG. 6 shows a fourth preferred embodiment which is powered by a solar power array (6*b*) and which stores the solar electricity inside rechargeable batteries (not shown) that have enough power to charge other electric or digital data device(s) though the built-in USB-unit(s) (6*i*)(6*h*) and outlet-unit (6*j*) having appropriate circuit to meet market requirements. From FIG. 6 the USB port (6*i*) which is installed on the adjustable arm (6*d*) base. And base is solid-piece and is raised piece same as (8*e*) of FIG. 8, and as (14*t*) of FIG. 14 with big details drawing which have USB-unit (14*g*) (14*h*), or-and outlet-unit (14*i*) (14*j*, or-and adjustable or selectors (14*e*) (14*f*,) or-and camera (14*c*), or-and motion sensor (14*e*), or-and speaker (14*d*). The details big-drawing show that the arm-base has sufficient space to install the USB-port (6*i*). The adjustable arm (6*d*) is bend-able and flexible to stay one desired angle and height with soft or-and comfortable coating or laminated or dip or other treatment so not see the inner cold-feeling and ugly metal piece.

FIG. 7 also shows the fourth preferred embodiment of a desk top item (7*a*) and USB module (7*d*), which can be powered by a solar panel (7*b*) or other available power sources from input conductive-wire (7*e*) including wind power, chemical power, battery power, a generator, a transformer, adaptors, an inverter, an inductor, etc., and which may further include a switch (7*c*) and lamp post (7*e*) corresponding to the one shown in FIG. 6. From FIG. 7 also show the switch (7*c*) which can be any kind from market available type.

FIG. 8 shows that the base of the desk top item of the first preferred embodiment may be made thicker or higher base or housing (8*a*) to accommodate bigger size electric parts and accessories to save a lot of the cost of super compact, slim, or cute size electric parts and accessories. Furthermore, the thicker or higher base or housing (8*a*) can also accommodate a rotating USB-unit(s) or USB-module that can be rotated from a first surface to a second surface so that the first surface of the USB-module will look nice when the USB-unit(s) or module is not in use. From FIG. 8 also show the desk lamp has one arm-base (8*e*) which is very solid piece and raised-up on main-base (8*a*) to hold the bendable-arm (8*f*) which has bendable or flexible tube (not shown) but it is cheap-metal piece so preferred has plastic or compound to sealed by coating or sleeve or envelope or dim or other market process to make the value looking and comfortable touch feeling. From FIG. 8 show the main-base has the thicker base which not only can install the rotating USB or-and outlet-units. Details of the rotating USB module can be understood from FIGS. 18, 19, 20, 21, and 22, the details of which are explained in the inventor's copending U.S. patent application Ser. No. 13/117,227. It will be appreciated that the details disclosed in the copending application may be applied to the present embodiments without departing from the scope of the current invention.

FIGS. 9, 10, 11, and 12 show fifth and sixth preferred embodiments which also have a thicker or higher base for the desk top items with LED(s) light-source, and to which rotating USB-modules (9i) with rotating rim (9k) having a plurality of USB-unit(s) (9m) and outlet-unit (9n) and other receiving ports (9p) can be added to increase the number of function(s), feature(s), effects, and/or performance(s). The USB-modules (9i) to (9m), (10(g), and (11e) to (11f) of these embodiments have more than 1 surface to enable different surfaces to be exposed for different purposes. The more than 1 surface of the USB-module can be any number from 2 to N. From FIG. 9 show the main-base (9a) has two rotating USB-unit (9i) one is show the cosmetic appearance surface which has one mechanical locker (9j) to allow pop-out the other surface(s), and the other one show the multiple receiving-ports surface has USB-unit (9m) and outlet-unit (9n) and other port (9p) to offer desired USB or-and outlets or-and other receiving-ports functions with outside transformer to supply DC power into inner circuitry or electric parts to offer operation current to LED(s), USB-unit(s), Outlet-unit(s), other built-in additional functions except the lighting.

From FIG. 10 and FIG. 11 and FIG. 12 show the different construction for the adjustable angle arm (10d) (11g) (12e) those are solid tube or bar 10 or rod as the above discussed desk lamp FIG. 5 and FIG. 4 which has adjustable angle-kits (5g) (4i) so can still adjust the solid piece tube, arms, rod, bars assembly to aim the LEDs light source to illuminate the desired area for min. A4 or B2 or More bigger areas depend on which type of LEDs arrangement selection including linear as FIG. 16, rows as FIG. 16, array as FIG. 18, matrix FIG. 18, donut as FIG. 15, circle as FIGS. 1,2, COB (Chip on-Bard) as (3k) (4k) of FIG. 3 and FIG. 4 arrangement of plurality of LEDs.

From FIG. 10 and FIG. 12 show the input power is DC current from outside AC-to-DC transformer (10c) (12c) which connect with the main-base (10a) (12a) female receiving-ports to supply the DC current into the said LED desk lamp for power need for (1) LEDs (2) USB-units (3) other built-in LED desk lamp DC power addition or existing functions as shown on the FIG. 24 for projection function, or FIG. 25 for drink functions, FIG. 26 for air-freshener, FIG. 27 time piece, FIG. 28 food supplier function, FIG. 29 fan or ventilation or heater or moving or changeable light or LED light show functions.

From FIGS. 10, 11, 12 show the different switch (10f) (11i) (12f) to control the LED light or additional added-on functions to operate. The said switch (10f) (11i) (12f) also can be electric switch including all kind of sensor or remote controller.

FIG. 13 shows a desk top item (13a) which has a super big main-base (13h) so that a plurality of rotating USB-Modules (13c) to (13g) can be installed to enable a group of people to charge their electric or digital device(s) at the same time, such as in a train station, bus station, airport, meeting room, hotel lobby etc. From FIG. 13 while not use can rotate the rotating-unit to value and nice and net surface (13c) and while need to use all kind of female ports can just touch the locker (small oval shape unit) to let desired surface of female ports assembly pop-out and change to desired one from two or plurality of surfaces.

FIG. 14 shows desk top lamp main-base (14m) has LED and USB-unit(s) (14h)(14g)(14p)(14q), USB-module(s), or outlet-unit(s) (14i)(14j)(14n) to allow people to get or charge other electric or digital device(s), the items including added-on other functions may selected from group combination from a radio, timepiece, weather station display, fruit blender, food machine, liquid machine, LED lighting, light fixture, projector means, electric fan, heater or any conventional items with LED means built-in. The FIG. 14 has magnify size to show details for the arm-base (14a) and top LED lighting-shade holder (14v) and the arm-base (14a) has Sensor (14c) or-and adjustable or selective switch (14e) (14f), or-and Speaker (14d), or-and USB-units (14g) (14h), or-and Outlets (14i) (14j), or-and movable cover (14b). the said arm-base which can be a compartment which is permanently install or detachable construction.

From FIG. 14 show the Arms (14r) (14s) (14t)(14u) which form an arm on vertical-axis to get close people shoulder height as above discussed. The current arm(s) (14r) (14s) (14t) (14u) and main-base (14m) is one of alternative or equal function of replaceable embodiment for higher base such as above discussed higher cone or tower main-base so no need longer arm on vertical-axis. From side magnify drawing can see the similar cone or tower main base which is formed by (14m) and (14r) (14s) (14t) (14u) which can install all kind of application as above discussed, furthermore it can install additional functions unit which show on the FIGS. 23,24,25,26,27,28 and all these functions including below listed added-on so become built-in desk lamp or items has the functions which is one or more than one of (a) light beams, (b) a projected image, (c) a time image, (d) a clock, (e) illumination, (f) music, (g) AC power source, (h) electric signals, (i) photos, (j) digital signals, (k) air flow at a desired temperature, (l) moisture, steam, (m) smells, (n) liquid, (o) coffee/tea, and/or (p) food, or to serve as any other conventional device that people will stay around for period of time while their other devices are charging.

FIGS. 15, 16, and 17 show different LEDs used for LED lighting in the above-discussed preferred embodiments or other LED desk lamp or LED lamp for a desk top. From FIGS. 15, 16, 17 and FIGS. 1,2,3,4,6 show some preferred design for LEDs so can get min. paper size of A4 or B2 or much bigger area for desired even or non-reflective photometric effects or brightness or colors to protect people eyes while people reading or working. The single LED-unit is not enough to make the min. paper size of A4 or B2 or more bigger areas has good and even brightness so need the circle, round, donut, linear, lines, rows, array, matrix with proper spacing for plurality LEDs to get minimum paper size of A4 or B2 or bigger areas for good and even brightness and color or other eye-optics requirement for reading.

FIGS. 18, 19, 20, 21, and 22 show details of a USB-Module (18b)(19b) with at least one USB-unit (19g) and a plurality of additional receiving means, which may include a USB-unit(s) (19h), outlet-unit(s) (19i)(19j), internet-unit(s), adaptor-unit(s), other light means, or another light source with appropriate parts and accessories, or any conventional available receiving means, the USB-module having at least more than 2 surface(s) (e.g., surface (18c) on one side and the USB-unit(s) on the other side), each surface with its own special design.

FIGS. 23, 24, 25, 26, 27, 28, and 29 show all kinds of desk top items or-and LED desk Lamp which offer function(s), effects(s), performance(s) to people's eyes, nose, mouth, and ears so that people can stay nearby for a period of time as they work, rest, sleep, or stand. The desk top items each have LEDs and USB-unit(s) to charge other electric or digital data device(s) and are arranged to generate, exhibit, or provide (a) light beams, (b) a projected image, (c) a time image, (d) a clock, (e) illumination, (f) music, (g) a AC power source, (h) electric signals, (i) photos, (j) digital signals, (k) air flow at a desired temperature, (l) moisture, steam, (m) smells, (n) liquid, (o) coffee/tea, and/or (p) food, or to serve as any other conventional device that people will stay around for a period of time while their other devices are charging.

Figure 23:
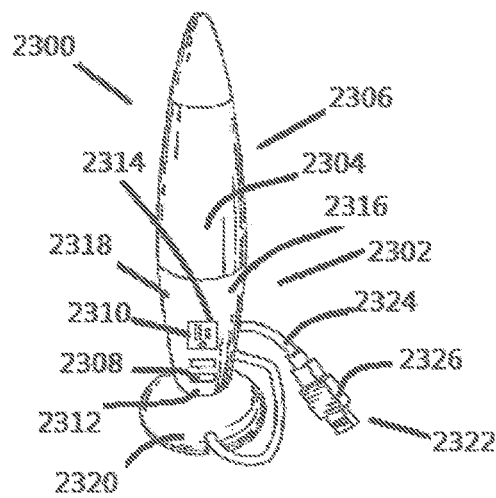
Figure 19:
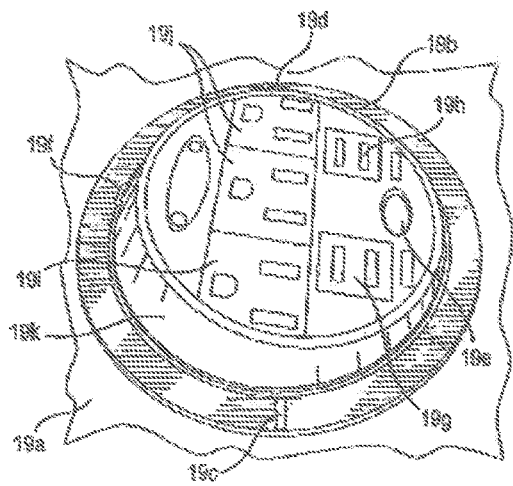
Figure 21:
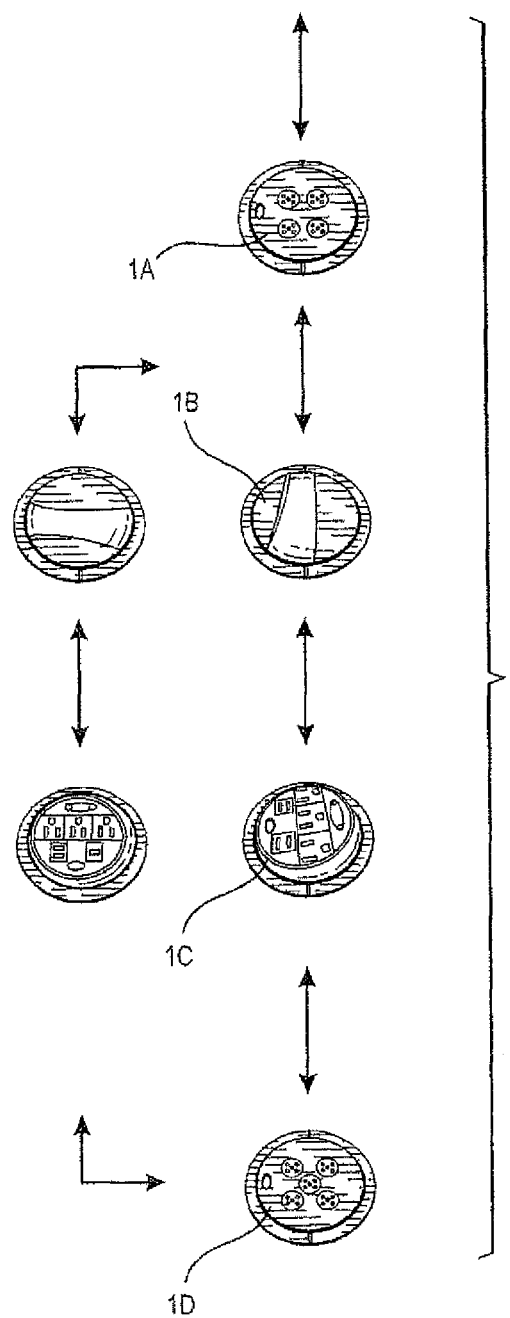
Figure 22:
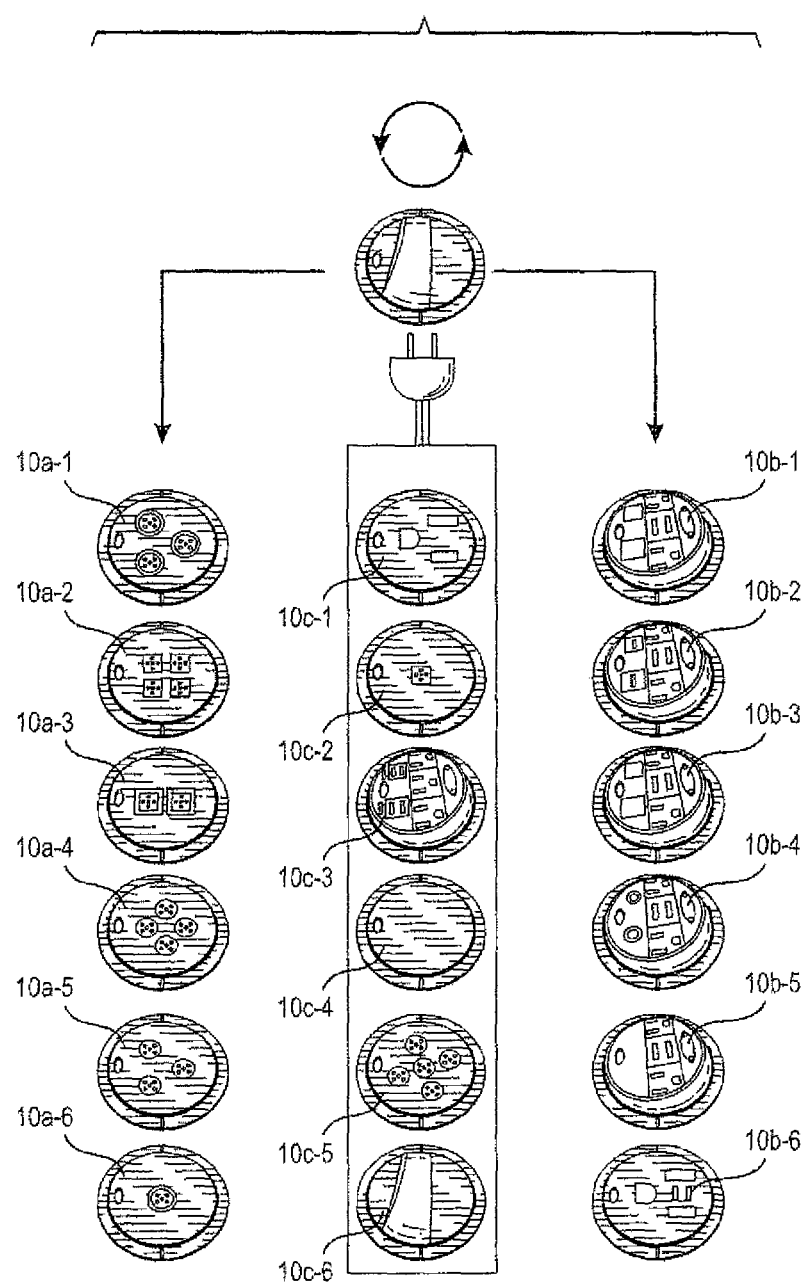

From FIG. 23 show the desk top items (2300) is one of the Liquid light application s which has base (2320) top has cone or collar or tube like compartment (2318) has built-in circuitry to get outside power from male plug (2326) and wire (2324) to input the AC or DC power source into inner circuitry to supply the power to built-in USB-ports (2308) or-and outlet-unit (2310) and inner LED(s) (not shown) and the top is liquid container (2304) which has desired inner liquid or-and optics-units to make the LED light beam to emit sufficient brightness basing on market requirement for reading or accent light or night light. The inner of the top compartment (2304) also can have design inner miniature items such as lava, sea shells, toy, reflectors, glitters . . . etc.

From FIG. 24 show the desk top items (2504) which has the LED(s) inside to offer the top project image or-and lighted pattern functions and also supply LEDs for ball illuminations or-and light beam to make surrounding areas for reading. The said surrounding areas illumination functions similar with LED-bulb which has plurality of LEDs inside to emit light to all directions. The said main-base (2502) is like tower or cone or twin-tower (2516) shape with center big radius so allow the top ball (2500) can be rotating to change the project light image or-and light patterns presentation location. The twin-tower main-base (2516) may have the 1-2 feet tall to allow close people shoulder or eye level to make design paper size A4 or B2 illumination. The twin-tower base (2516) has the built-in USB-unit (2508) or-and outlet-unit (25100 and get the power from outside AC power source (not shown) and go through inner AC-to-DC circuit and other electric-parts to get AC current to LEDs for surrounding-area illumination up to A4 or B2 or more bigger size, or the said USB-unit (2508) get the DC power source from outside AC-to-DC transformer to get desired DC power. The said twin-tower main-base (2516) may has special circuitry to get not only AC but also DC power from outside circuitry-unit.

From FIG. 25 show the desk top lamp or items has liquid supplier functions or warmer for liquid items. One of embodiment is the mini. Coffee brewer equipment can fit into the pre-designed space of the said big or tall main-housing of said LED desk lamp or items. The main-base or main-housing (2400) has the built in USB-port (2412) which can charge or supply the current to other electric or digital data device.

From FIG. 26 show the smell device which is one of desktop item or lamp which has proper space to install the said smell related device which including (1) air-freshener (2) fragrance dispenser or vaporizing unit (3) air-purifier (4) moisture absorber unit (5) liquid fragrance device (6) bug replier smell device and the smell can came out from openings or holes or slot as shown. The inside also has built-in plurality LEDs to make the whole or top or partial desk top item to supply desired light brightness, color, changing color, chasing light, fade-in or fade-out light while LEDs incorporate with IC and related electric parts and accessories and switch or-and sensors.

From FIG. 27 show the LED desk top item or lamp (2600) has built-in LEDs (2604) (2608) to offer the pin-hole image or lighted-pattern projection though the top shaped holes (2622) (2624) which is same as co-inventor (#GG-2008) US patent U.S. Pat. No. 8,231,260 for Pin Holes imaging. Some of the plurality of LEDs (2618) (2604) also offer the brightness to front displayer (2626) to show time/date/week/year or-and temperature or whether status (2620).

The main-base (2602) has variety of switch, sensor, remote controller receiver (1612) to make all setting, selection of the LED color, brightness, function selection, brightness selection, sensor selection of the built-in LEDs for top pin-hole image projection or-and the body glow light brightness and colors. The said main-base (2602) also has the 2 speaker (2628) (2628') to offer the said audio or music or melody or multiple way talking functions by blue-tooth, inserting portable flasher, remote receiver system. The said the desktop item or desk top lamp which has its preferred vertical-height or-and horizon-width so can allow the body glow light brightness can cover desired areas for people reading or work. The said main-base 2602 also has built-in USB ports (2612) (2608) to connect with circuitry and power source to supply or charge other outside device or even can charge inside built-in rechargeable batteries by desired type and size and specification USB-ports selections.

From FIG. 28 show the food supplier device (2700) for desktop item or lamp. The said food supplier device (2700) can make miniature size to fit into the big-and-tall main-base of the LED desk top item or lamp to offer people can get desired food or desert or cookie or candy (2720) from the built-in food supplier device (2700). Or, the food supplier device it is an individual products put on desktop as desktop item which has main-base (2716) which has built-in USB-ports (2712) or sensor, switch (2722) and can let people get the food, candy, cookie or chocolate or other food from the food supplier device (2700). It is appreciated the food supplier device is not limited for its size or tall or width. This depend on where to put.

From FIG. 29 show the air-flow device (2800) which supply desired air-flow from desktop item for hot, cold, warm, or just normal air-flow to people. The said air-flow device offers airflow to people under predetermined temperatures for different construction and parts. The air-flow device can install within the said LED desk top item (2300)(2400)(2500)(2600)(2700) or LED desk top lamp for big and tall main-base or main-housing so can offer people not only for LED desk top lamp with desired light illumination but also has the air-flow with preferred air for desired temperature even has moisture, depend on the market requirement. The said air-flow device has the blades which can have built-in LEDs on the blade with IC control so can create desired moving and changing message, drawing, display under the people eyes persistence reaction which is same as co-inventor's US prior arts including (# JJ-) (# JJ-1) (# JJ-2). From FIG. 29 show the airflow device which has a wire or bendable-arm to connect with male plug (2802) which can be a (AA) USB male plug, or (BB) external transformer wire male plug, or (CC) conductive wire to connect with desktop (2300) (2400) (2500)(2600) (2700) item or lamp power source which depend on which power source want to connect with.

The desk top items, which include LED means or an LED device, are items that are used in locations where they can be easily reached, touched, operated, or managed by people, i.e., in locations or places nearby where people will stay for period of time, such as a desk, table, bed, chair, land, grass, or wherever else people like to work, rest, sit, stand, or a take nap.

As noted above, the desk top items may offer electric signals to carry out functions such as (aa) illumination as FIGS. 1,2,3,4,5,6, 23,24,25,26,27,28, or-and (bb) sound as FIG. 14,27, or-and (cc) images as FIG. 24, or-and (dd) brightness, visual effects as FIGS. 1,2,3,4,5,6, 23,24,25,26, 27,28, or-and (ee) smell as FIG. 26, or-and (ff) water, liquid, food as FIGS. 25, or-and (gg) wind, moisture, airflow as FIGS. 29, or-and or any conventional functions of electric devices with built-in LEDs means, such as LED lighting, a clock as FIG. 27, projector machine as FIG. 24, film, digital photo frame, time display as FIG. 27, air freshener as FIG. 26, electric perfume freshener as FIG. 26, moisturizer as FIG. 26, electric fan as FIG. 29, electric heater as FIG. 29, electric steam spreader as FIG. 29, electric cooler as FIG. 29, electric air conditioner as FIG. 29, or other conventionally available items that can be placed to or add-on the said LED desk lamp to let people easily reach, touch, operate, or manage the items.

The desk top items may be powered by a direct current (DC) power source such as FIGS. 1,2,3,4,5,6,10,12 from outside transformer, or alternating current (AC) power source having appropriate AC-plug wire or electric parts and accessories or components, such as circuit, IC, sensor, a motion sensor, timer, time delay, timer, resilient kits, conductive kits, transformer, inverter, adaptor, wire, prong, UL listed adapter, PIR, infrared kits, master power control kits, and/or AC power outlet-unit(s) to offer electric power at a voltage (Volt) and amperage (Amp or ma) sufficient to achieve a desired charging time. The USB-unit(s) only serve as a power source for charging other electric or digital device(s) and do not have an electric data transfer function. If a plurality of USB-units are provided, the USB-units can be arranged to have different output power to charge different electric or digital data device(s). If additional outlet-units are provided the outlet-units may be AC outlet-unit(s) that serve as an AC power source.

Electric or digital data device(s) that may be charged by the USB-unit(s) include an MP3 or MP4 player, smart phone, computer, iPhone™, iPad™, video game, digital visual equipment, communication equipment, and other consumer electric products.

The USB-unit or USB-module of the preferred desk top items may be turned on or turned off for a predetermined time by switch, sensor, timer, photo sensor, motion sensor, time delay, and/or master control power system.

All electrical connector or plug receiving port(s) in the desk top items, including USB-units or USB modules, outlets, adaptor-hole, transformer-ports may have a removable cover to allow kids or others to safely touch the items and prevent dust, or water from getting into the receiving means.

The USB-unit or USB-module to charge other electric or digital device(s) can be removable from the desk top items and carried with people to use when people leave the desk top items. For this purpose, the USB-unit(s) or USB-module(s) can be disassembled from the desk top items and re-assembled into the said desk top items by a quick connector or adaptor, or assembly or fixing kits for assembling or fixing the USB-units or modules to the desk top items, with each of the USB-unit(s) or USB-module(s) having its own safety certification(s) so that the individual USB-unit(s) or USB-module(s) can be tested by safety authorities and sold separately with safety certification or marking.

The USB-unit(s) includes an electric charging unit which has a USB-female receiving ports to receive a USB-male prong to deliver electric power from the USB-female receiving ports to the other device's USB-male prong. The preferred USB-female receiving ports gets power from a power source and uses its circuit to convert or transform the electric power to a desired waveform, voltage, and current sufficient to charge other electric or digital device(s).

The items of these embodiments may be in the form of LED lighting, an LED desk lamp, LED table lighting, LED lava light, LED projection light, LED time piece, LED electric fan, LED air freshener, LED indicator coffee machine, LED indicator sound device, and LED visual device.

I claim:

1. A non-portable LED desktop light device, comprising:
   at least one LED light source for area illumination and an integrated circuit to control light functions or effects;
   at least one USB charger to charge external products through at least one built-in USB port;
   at least one time related device built-in the LED light device, wherein the time related device is at least one of a clock, time piece, weather display, and digital time display; and
   an input circuit for inputting DC power from an external AC-to-DC transformer that converts AC power to DC power, and for providing the DC power to the at least one LED light source, the USB charger, and the time related device.

2. A non-portable LED desktop light, comprising:
   at least one LED light source for area illumination and an integrated circuit to control light functions, color, brightness, or effects;
   at least one USB charger to charge external products, or a USB plug-wire to input DC power, through at least one built-in USB port;
   an input circuit for inputting DC power from an external AC-to-DC transformer that converts AC power to DC power and providing the DC power to the at least one LED light source, the USB charger, the integrated circuit, and an inner circuit.

3. A non-portable desktop image projection or reflection device having LED light, comprising:
   at least one of an image projector or image reflector;
   at least one LED built-in the image projection or reflection device to supply light to the image projector or image reflector;
   an integrated circuit to control light functions or effects;
   at least one USB charger to charge external products through at least one built-in USB port;
   an input circuit for inputting DC power from an external AC-to-DC converter that includes a transformer, that converts AC power to DC power and providing the DC power to the at least one LED and the USB charger.

4. A non-portable desktop light, comprising:
   at least one LED bulb or CFL bulb to serve as a light source for area illumination;
   an integrated circuit to control light functions or effects; and
   at least one USB charger to charge external products through at least one built-in USB port,
   wherein AC power for the LED or CFL bulb is supplied from an AC power source to the desktop light through an AC plug wire without an external transformer, and
   further comprising a built-in AC-to-DC circuit to supply DC power to the at least one USB port.

5. A non-portable desktop time related product, comprising:
   at least one time related display device having at least one LED as a display light source or backlight for an LCD display, wherein the time related device is at least one of a clock, time piece, weather display, and digital time display;
   an integrated circuit to control or adjust light functions or effects; and
   at least one USB charger to charge external products through at least one built-in USB port,
   wherein AC power is supplied from an AC power source to the desktop light through an AC plug wire with no external transformer, and further comprising a built-in AC-to-DC circuit to supply DC power to the at least one LED and the at least one USB port.

\* \* \* \* \*